United States Patent Office 3,367,505
Patented Feb. 6, 1968

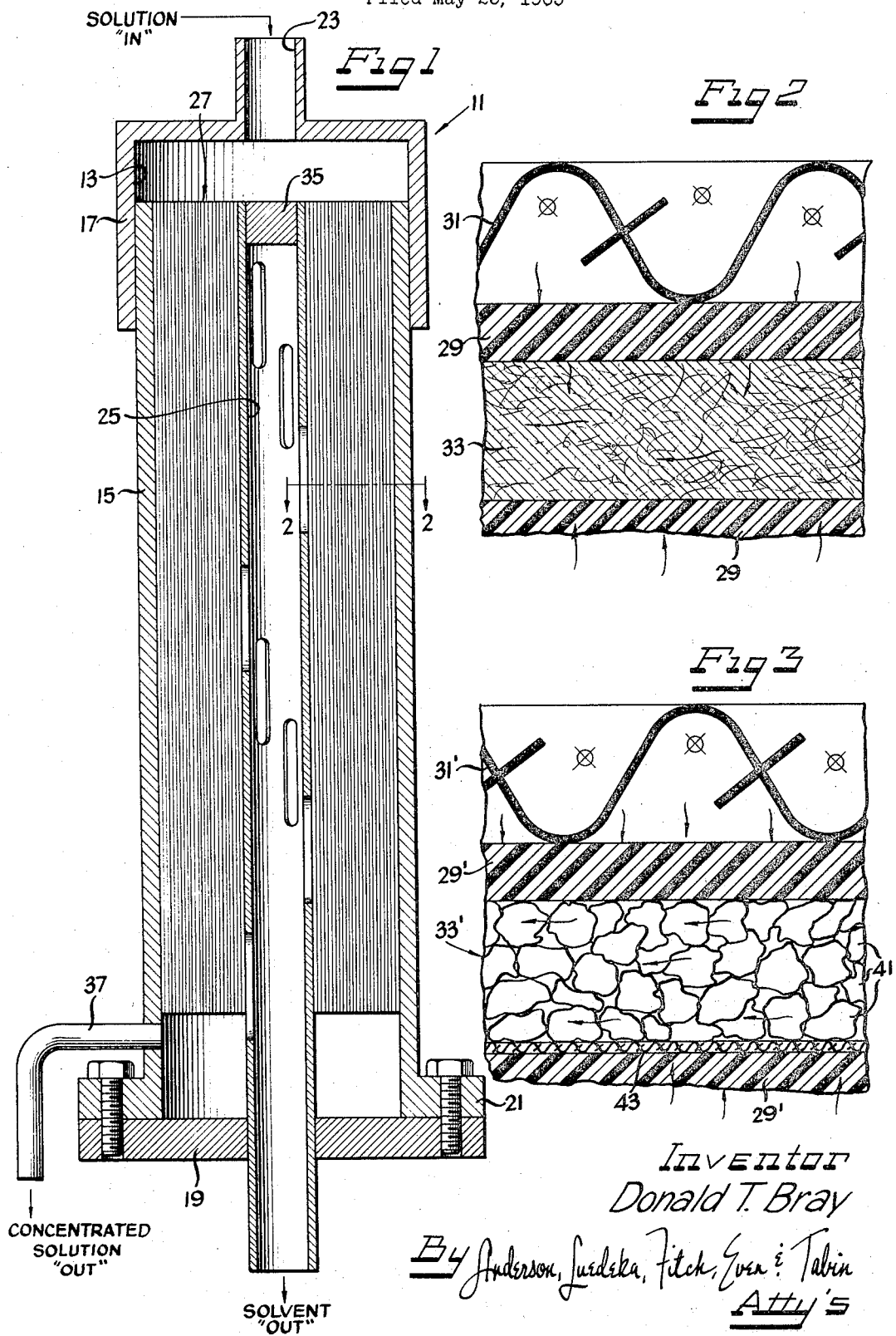

3,367,505
SEMIPERMEABLE MEMBRANE BACKING AND
SUPPORT MEDIUM
Donald T. Bray, San Diego, Calif., assignor, by mesne
assignments, to Gulf General Atomic Incorporated, San
Diego, Calif., a corporation of Delaware
Filed May 25, 1965, Ser. No. 458,719
6 Claims. (Cl. 210—321)

ABSTRACT OF THE DISCLOSURE

Separation apparatus for separating a first fluid component, e.g., pure water, from a fluid mixture, e.g., sea water, employing semipermeable membranes and a backing material therefor which is constructed to support the membranes to prevent excessive irregular physical deformation thereto while at the same time resisting compaction to provide an adequate fluid flow passageway in the plane thereof. One such backing material includes interconnected particles of a predetermined size range retained in sheet-like form by attachment to a porous fibrous substrate. Another such backing material is a felt of glass fibers of predetermined diameter, length and porosity.

---

This invention resulted from work done under Contract No. 14–01–0001–250 with the Office of Saline Water in the Department of the Interior entered into pursuant to the Saline Water Act, 42 U.S.C. 1951–1958g.

This application relates to separation apparatus, and more particularly to a material for supporting a thin semipermeable membrane which is exposed to a high fluid pressure in such a separation apparatus.

Various thin membranes have the capacity to separate a solvent from a solution containing a solute. Examples of membranes of this general type are the osmotic membranes disclosed in U.S. Patent No. 3,133,132 to Loeb et al. Such semipermeable osmotic membranes have a pore structure which chemically and/or physically rejects a very high percentage of the ions in the solution while permitting the solvent to pass therethrough. Apparatus embodying an osmotic membrane of this type may be used to produce a pure product, as in the desalination of sea water, or may be used to concentrate a solution by removing the solvent and thus increasing the percentage of solute in the solution. As is expected in a separation process of this type, the rate of flow of solvent through the membrane from a solution increases with an increase in the pressure of the solution. To take advantage of these higher rates of flow through the membrane, it is often desirable to operate the separation apparatus at higher solution input pressures.

Membranes of this type require only fairly thin thicknesses to perform effectively; for example a cellulosic ester osmotic membrane made as described in Patent No. 3,133,132 operates effectively at a thickness of about 0.004 inch because its capability to reject solute is generally independent of its thickness. Of course, the flux or flow of solvent through such a membrane increases proportionately with the surface area of the membrane with which the solution is in contact. Therefore, designs for efficient separation apparatus logically employ thin membranes to provide a large effective membrane surface area within a given volumetric space. Apparatus of this general type is disclosed and described in detail in my co-pending application, Ser. No. 441,591, filed Mar. 22, 1965.

When membranes of fairly low thicknesses are used, the strength of the membranes becomes important. It is an even more important consideration when these thin membranes are subjected to fairly high solution pressures, for example 500 p.s.i. and above. To permit the effective utilization of a thin membrane, it is important that the membrane be suitably supported at the surface opposite from that to which the fluid pressure is applied. Supporting materials should provide adequate support to the membrane without creating an undesirably high pressure drop in flow therethrough. In many instances, such as the purification of water, cost is quite important for an apparatus to be competitive with other apparatus offered. Accordingly, inexpensive supporting materials are desired. It is also desired that the supporting material may itself serve as an exit passageway which conducts the fluid that passes through the membrane to a suitable outlet.

It is the object of the present invention to provide improved apparatus for the separation of fluid from a fluid mixture. It is another object to provide an improved supporting material for the support of a semipermeable membrane in apparatus of the above type. It is a further object to provide an improved supporting material of sheet form for a thin semipermeable membrane which material itself provides a good flow path of fluid therethrough in the plane thereof. A still further object is to provide improved apparatus for the separation of fluid from a fluid mixture which can efficiently operate at a high inlet pressure. Still another object it to provide an inexpensive supporting material which is suitable for the support of a semipermeable membrane in a separation apparatus which operates at fluid inlet pressures up to about 2500 p.s.i. A still further object is to provide an inexpensive supporting material of thin sheet-like form which adequately supports a semipermeable membrane and which itself resists compaction and thus remains porous over prolonged periods of use. These and other objects of the invention are more particularly set forth in the following detailed description and in the accompanying drawings wherein:

FIGURE 1 is a diagrammatic cross-sectional view of a separation apparatus embodying various features of the invention;

FIGURE 2 is an enlarged, fragmentary cross-sectional view looking downward generally along line 2—2 of FIG. 1; and FIGURE 3 is a view similar to FIG. 2 through an alternate embodiment of a separation apparatus.

It has been found that a mat or felt of glass fibers provides adequate support for a thin semipermeable membrane operating under high fluid inlet pressures and provides a good flow path in its own plane. It has also been found that a layer of particles of sand or of other chemically nonreactive materials, bonded to a thin felt of plastic fibers or other fibers, also provides good support for a thin semipermeable membrane operating at high fluid inlet pressures and also provides a good flow path for the output fluid which passes through that membrane.

Illustrated in FIGURE 1 is a separation apparatus 11 of the general type disclosed in the aforementioned pending patent application. The apparatus 11 generally comprises a high pressure cylindrical chamber 13 fabricated from an outer shell 15 having a cap 17 secured to its upper end and a plate 19 sealed to a flange 21 at the other end. The cap 17 is formed with an inlet 23 through which the input solution is supplied. A central tube 25 extends from a point near the top of the chamber 13 and downwardly through the bottom plate 19. This tube 25 is perforated and serves as the outlet manifold to collect the fluid which has passed through the membrane.

Separation of fluid from a fluid mixture is accomplished by a membrane arrangement 27 which fills the annular space between the inner wall of the shell 15 and the central tube 25. The membrane arrangement 27 comprises a plurality of sheets of semipermeable membranes 29 each disposed with a layer of supply material 31 adjacent one side of the membrane 29 and a sheet of supporting material 33 adjacent the opposite side of the membrane 29. Both the supply material layers 31 and the support material sheets 33 provide a path for fluid flow in the planes thereof.

In the particular membrane arrangement illustrated in the previously mentioned pending patent application, Ser. No. 441,591, a sandwich arrangement is employed in which a sheet of membrane material 29 is folded over a layer of the supply material 31 so that a membrane surface lies adjacent both surfaces of the supply material layer 31. A plurality of these sandwiches of membrane and supply material are placed between sheets of supporting material 33 and wrapped spirally about the perforated central tube 25 to provide a large amount of effective membrane surface in a fairly small space. Of course, other suitable membrane arrangements may also be used.

As seen in FIGURE 1, the membrane arrangement 27 occupies the annular space between the shell 15 and the central perforated tube 25, and the fluid mixture to be treated is fed into the chamber 13 at the top through the inlet 23. To facilitate flow of the input fluid mixture downward through the supply material 31, the upper edges of the sheets of membrane 29 and supporting material 33 are sealed off, and the top of the tube 25 is closed with a plug 35. The open upper ends of the layer of the supply material 31 channel the entire flow of the input fluid mixture therethrough to the bottom of the chamber 13. At the bottom, the fluid mixture which is now in more concentrated form leaves the chamber 13 via a side outlet 37. Suitable valving (not shown) permits the flow rate and pressure fluid mixture through the apparatus to be adjusted as desired.

Because of the passage of a first fluid component through the osmotic membrane 29 while a very high percentage of the second component is rejected, the concentration of the non-permeating component in the feed mixture becomes steadily higher as the feed mixture travels downward through the membrane arrangement 27. The fluid component which passes through the membrane 29 reaches the supporting material 33 on the opposite side thereof. The supporting material 33 provides a flow path radially inward to the perforated tube 25 which serves as the outlet manifold. Through this tube, the permeated component exits from the apparatus 11.

In apparatus of this type, the membrane 29 may be of any suitable material which exhibits such a semipermeability that permits one fluid component, such as a solvent to pass therethrough while rejecting the major proportion of a second component, i.e., the solute, contained therein. Examples of membranes of this general type include the cellulose acetate membrane disclosed in the previously mentioned U.S. patent, polyvinyl methyl ketone membranes, and membranes made of a copolymer of polyvinyl alcohol and a mixture of methyl vinyl ether and maleic anhydride. Inasmuch as the capability of these membranes for the rejection of the solute in a solution depends primarily upon the characteristics of a very thin or barrier layer of the membrane, the rejection capability of these membranes is generally independent of the thickness of the membrane and very thin membranes are employed, on the order of 0.004 inch for instance.

For such a use of very thin membranes to be technically and economically feasible, suitable membrane supporting materials 33 should be provided which do not adversely interfere with or block the flow through the membrane 29. This is of even more importance when the membranes 29 are to operate at high solution input pressures, for example 1000 p.s.i. and higher. Where the supporting material 33 is also used to provide a flow passageway for the permeated component, the supporting material should also be resistant to significant compaction which could undesirably decrease flow therethrough.

A felt of nonwoven glass fibers has been found to provide adequate support for the membrane and, at the same time, provide a good flow path for the output fluid. To provide adequate support and a good output flow passageway, it is believed that a felt of this type should have a nominal thickness of about .020 inch. It is preferred that the glass felt be made of glass fibers of fairly large size. In this respect, the glass fibers employed are preferably about 25 microns in diameter although fibers of about 10 microns are considered suitable. The porosity of the felt generally determines both the amount of support it gives the adjacent member 29 and the resistance which it exhibits to the flow of permeated fluid therethrough. The felt should have an open porosity of at least about 10% and preferably at least about 50%.

A felt with the above characteristics is considered to provide excellent support to the membrane at feed pressures up to about 500 p.s.i. while resisting compaction sufficient to provide a good flow path for permeated liquid therethrough. Moreover, glass felt of this type is reasonably inexpensive and is therefore well-suited for separation apparatus to be used for the purification of saline water wherein the cost is a very important factor because the apparatus faces competition from other types of process apparatus for accomplishing the same result.

This glass felt material also can be used at pressures in excess of 500 p.s.i. However, at such pressures, the performance of glass felt backing material is reduced. Moreover, at pressures above about 500 p.s.i., overlapping glass fibers may be broken into small needle-shaped units of an average length only a few times their diameter. Although these randomly distributed needles function adequately as membrane support material and as a porous medium for the flow of fluid to the central tube 25, the resistance to fluid flow when the felt is broken into needles is considerably greater than in the original fibrous form.

As an alternative to the use of glass felt alone as the supporting material 33, a layer of small particles 41 of predetermined size may be applied to a very thin substrate 43 of felt, paper, or some other type of sheetlike material which will retain the particles 41 in place during module assembly and which is somewhat porous. One such arrangement is illustrated in FIGURE 3 wherein prime numbers are used to identify parts comparable to those in FIGURE 2. The particle layer 41 contacts the membrane 29' and supports it while also providing the flow path of the permeated fluid to the output manifold. The underlying sheet 43 serves primarily as a carrier or retainer for the particulate layer 41. However, since a porous material is employed as a substrate 43, the substrate also provides a portion of the total output flow passageway. Another sheet (not shown), similar to the substrate 43, may be used to support the membrane 29' over voids in the particulate layer 41. When an additional layer of porous sheet material is used between the membrane 29' and the particulate layer 41, larger sized particles may be used in the particulate layer.

To provide an adequate flow passageway, the layer of discrete particles 41 should be at least about 10 mils in thickness. The underlying substrate 43 preferably has a maximum thickness of about 4 mils. The substrate 43 needs only to be thick enough to support the particulate layer 41 during assembly and therefore should be no thicker than necessary to accomplish this process. In this respect, a substrate 43 of any suitable material which is chemically nonreactive with the feed mixture being treated and which has adequate strength in thin sheet configuration may be employed. Examples of suitable substrates 43 include felts, cloths or paper made of plastic fibers, natural fibers or glass fibers, with polyester fibers being preferred. The material used for the substrate 43 should have some degree of porosity.

Any suitable particulate material 41 which is chemically nonreactive with the solutions to be treated and which is relatively inexpensive may be employed. Examples of suitable particulate materials include, but are by no means limited to, sand, alumina and silicon carbide. A suitable binder or adhesive is employed to bond the discrete particles 41 to one another and to the underlying substrate 43 without filling the interspaces between these particles 41 so as to undesirably reduce the liquid passageway therethrough, preferably a latex adhesive is employed.

It is important that the discrete particles 41 be sized properly so that the resistance of the supporting material 33 to liquid flow (also hereinafter referred to as the output-side pressure loss) may be held within acceptable limits. Too small an interspatial unit volume results in a large pressure drop in the liquid on the output side. A large output-side pressure loss tends to reduce the rate of flow of output away from the membrane 29, thereby exerting a back pressure on the membrane. This, in turn, reduces the pressure difference between opposite sides of the membrane 29 which drives the separation operation, thus resulting in a lower output flow.

Some back-pressure is, of course, acceptable, but it is preferably kept as low as possible. For example, when the illustrated apparatus 11 is operated at a feed mixture pressure of about 1500 p.s.i., and a product output rate of about 5 ml. per min. per 100 sq. in. of effective membrane surface (based on a sandwich arrangement wherein a membrane is disposed adjacent each side of the support material sheet), an average back pressure on the output-side of no more than about 300 p.s.i. for a flow path of 12 inches is considered acceptable. It has been found that a supporting material 33' comprising a layer of particulate material, about 10 mils thick, of particles between about 125 microns and about 150 microns may be employed to provide structure having a back-pressure of the above-stated amount. Obviously, other particles in this general size range, or mixtures of particle sizes, which provide a generally equivalent interspatial unit volume may be used to make the particulate layer 41.

The following examples are detailed descriptions of various processes for producing acceptable supporting materials for use in separation apparatus of this general type, which supporting materials embody various features of the invention. It should be understood however that the following examples in no way limit the scope of the invention which is defined solely by the claims appearing at the end of this specification.

*Example I*

A composite material 33' is made from particles of sand (silicon dioxide) in the size range of —80, +100 mesh, i.e., particles which pass through a screen having openings about 150 microns in size and which are retained on a screen having openings about 125 microns in size. A sheet of Dacron polyester fiber felt 43, having a thickness about 4 mils, is covered with the sized sand particles 41 to provide a layer about 20 mils thick, a total composite sheet thickness of about 24 mils. The particles and the felt 43 are coated with an adhesive of latex and water applied in sufficient quantity to produce a thin film layer around each particle and upon the felt fibers. After the adhesive is dry, the particles 41 are held to one another and to the felt 43 with sufficient strength to allow assembly handling of the composite support material 33'.

Layers of this sand material are installed as backing and support material 33' for a semipermeable osmotic membrane 29' of cellulose acetate, having a thickness of about 4 mils, in an apparatus similar to that shown in FIGURE 1, e.g., each layer of sand material being sandwiched between two layers of membrane. Individual layers of this sand material, of dimensions about 8 in. x 21 in., are employed in an arrangement 27 so that the maximum flow path, in a horizontal plane, inward to the manifold 25 measures about 21 inches. The membrane arrangement 27 is of the illustrated spiral form with edges of the support material 33' in communication with the output manifold tube 25, through the slots provided therein, and with the upper and lower ends of the sheets of membrane 29' and supporting material 33' sealed approximately to preclude any solution flow therethrough.

After assembly of the separation apparatus 11 is completed, a solution of sea water at about 3.5 weight percent salts is applied to the inlet 23 at about 1500 p.s.i. The application of this pressure causes flow downward in the supply layers 31' through the membrane arrangement 27 to the feed outlet 37. The solution flow rate is regulated so that an average linear flow downward along the membrane surface is established at about 5 cm./sec. Operation of the separation apparatus 11 at these conditions results in an initial product water output rate of about 6 ml./per min. per 100 sq. inches of effective membrane surface of water. The output water has a total salt content less than about 0.25% by weight. The initial back pressure on the membrane 29' is calculated to be about 300 p.s.i., average.

After operation of the apparatus 11 for a period of 600 hours, it is disassembled and the membrane arrangement 27 is examined. During this 600 hour period, the product water flow rate gradually decreases to about 3 ml./min. per 100 sq. inches, and the back pressure on the membrane decreases to about 150 p.s.i., average. The percentage of salt in the product water remains about the same. The examination shows that the cellulose acetate membrane exhibits no significant irregular physical deformation as the result of operation in this relatively high pressure range. The only physical deformation which does occur is compression of the membrane, which is related to the above-noted reduction in product water flux through the membrane. This reduction in water flux is unrelated to the supporting material. Accordingly, this composite supporting material 33' is considered suitable for backing a thin semipermeable membrane for use in separation apparatus of the general type described.

The above-described steps are repeated to produce another supporting material 33' which is 9 x 12 inches in size. This supporting material is installed in a separation apparatus as set forth above with a semipermeable membrane of cellulose acetate about 4 mils thick installed on each side of it. Thus, each piece of support material of this size provides support for about 216 sq. inches effective membrane surface.

This apparatus is operated on sea water containing about 3.5 weight percent salt. The sea water is applied to the inlet 23 at about 2000 p.s.i., and the flow rate is regulated so that the average linear flow downward along the membrane surface is about 5 cm./sec. Operation of the separation unit at these conditions results in a product water output rate of about 25 ml. per minute per 100 sq. inches of effective membrane surface. The back pressure on the membrane is calculated to be about 200 p.s.i. average for this maximum flow path to the manifold of 12 inches. Product water of less than 0.05 percent salt, by weight, is obtained.

After operation of the apparatus over a few hundred hours, the product water flow rate gradually decreases as a result of compression of the membrane 29', as set forth above. The back pressure accordingly decreases although the percentage of salt in the product water remains substantially the same. Disassembly and examination show that the membrane 29' exhibits no significant irregular physical deformation, as a result of operation at this relatively high pressure range, which would be attributed to the supporting material 33'. This composite supporting material is considered completely suitable for use in an apparatus of this type at the conditions noted.

EXAMPLE II

Felt is made from a quantity of fibers of soda-lime-silicate glass having an average diameter of about 25 microns. These fibers are cut into short lengths, averaging about 1 mm., mixed with sufficient water to produce an aqueous slurry, and layed down using the normal procedures to form a felt having a thickness (when dried) of about 10 mils. The water from the slurry is removed, and a coherent strong glass fiber felt results. The density of this glass fiber felt is about 0.35 gms./cc., and the open porosity is about 80%.

Layers of this glass fiber felt are installed as a backing and support material 33 for a semipermeable osmotic membrane 29, as set forth in Example I above. Two layers of this material, back-to-back, about 9 inches wide by 12 inches long are employed to provide a support material about 20 mils thick. The support material is sandwiched between two sheets of 4 mil cellulose acetate osmotic membrane and arranged so that the maximum flow path inward, in a horizontal plane, measures about 12 inches.

After assembly of the separation apparatus 11 is completed, water having an NaCl content of about 0.5 percent by weight is applied to the inlet 23 at 500 p.s.i. The feed input and outlet rates are regulated to establish an average linear flow rate downward along the membrane surface of about 5 cm./sec. Under these conditions, the product water flow rate is about 10 ml./min. per 100 sq. inches of effective membrane surface, and the back pressure on the membrane 29 is about 100 p.s.i., average. The output water has a salt content of about 0.05 percent by weight.

After continuous operation of the apparatus 11 for a period of 100 hours, it is disassembled and the membrane arrangement 27 is examined. The examination shows that the thin cellulose acetate membranes exhibit no significant irregular physical deformation as the result of operation under this pressure during this period. This glass fiber felt supporting material is considered suitable for use in a separation apparatus of this type, at about this pressure.

Although the invention has been described with reference to certain specific examples and materials, it should be understood that these do not constitute limitations upon the scope of the invention and that modifications, which would be obvious to one skilled in the art, are considered as coming within the scope of the invention that is defined by the appended claims.

Various of the features of the invention are set forth in the following claims.

What is claimed is:

1. In a separation apparatus for separating a first fluid component from a fluid mixture which apparatus includes a flexible semipermeable membrane sheet, means for supplying under pressure a fluid mixture of a first fluid component and a second component to one side of the membrane sheet, the membrane when contacted with the fluid mixture above a certain pressure permitting passage of the first fluid component therethrough from the one side to the other side while rejecting passage of a high percentage of the second component, and flexible membrane supporting means in contact with the other side of the membrane sheet, said fluid supply means, said membrane and said supporting means being flat sheets that are wound into a spiral configuration, the improvement which comprises said supporting means providing support for said membrane to prevent excessive irregular physical deformation of the membrane sheet from the fluid mixture pressure, said supporting means including a continuous layer of particles of a predetermined size range interconnected with one another, said particle layer providing a good fluid flow passageway in the interspaces between said particles, said particles being retained in sheetlike form by attachment to a porous flexible substrate which provides a fluid flow passageway in the plane thereof.

2. The invention in accordance with claim 1 wherein said particles are interconnected by a latex adhesive.

3. Separation apparatus for separating a first fluid component from a fluid mixture comprising a semipermeable membrane sheet, means for supplying under pressure a fluid mixture of a first fluid component and a second component to one side of said membrane sheet, said membrane when contacted with the fluid mixture above a certain pressure permitting passage of the first fluid component therethrough from said one side to the other side while rejecting passage of a high percentage of the second component, and a layer of particles of a predetermined particle size range in contact with said other side of said membrane sheet and providing support therefor to prevent excessive deformation of said membrane sheet from said fluid mixture pressure, said layer being at least about 10 mils thick, said particles being retained in sheet-like form by attachment to a flexible porous substrate, and said particle sizes being such that a good fluid flow passageway is provided in the plane of said sheet-like particle layer by the interspaces between particles, said fluid supply means, said membrane and said particle layer and substrate being wound in a spiral from a normally flat condition.

4. Separation apparatus for separating a first fluid component from a fluid mixture comprising a semipermeable membrane sheet, means for supplying under pressure a fluid mixture of a first fluid component and a second component to one side of said membrane sheet, said membrane when contacted with the fluid mixture above a certain pressure permitting passage of the first fluid component therethrough from said one side to the other side thereof while rejecting passage of a high percentage of the second component, and membrane supporting means in contact with said other side of said membrane sheet and providing support therefor to prevent excessive irregular physical deformation of said membrane sheet from said fluid mixture pressure, said supporting means including a layer of particles of a predetermined particle size range which particles are retained in sheet-like form by attachment to a substrate in the form of a felt of fibers.

5. Separation apparatus for separating a first fluid component from a fluid mixture comprising a semipermeable membrane sheet, means for supplying under pressure a fluid mixture of a first fluid component and a second component to one side of said membrane sheet, said membrane when contacted with the fluid mixture above a certain pressure permitting passage of the first fluid component therethrough from said one side to the other side while rejecting passage of a high percentage of the second component, and membrane supporting means in contact with said other side of said membrane sheet and providing support therefor to prevent excessive irregular physical deformation of said membrane sheet from said fluid mixture pressure, said membrane supporting means including a layer of interconnected particles disposed upon a thin porous fibrous substrate, said particle layer being made from particles between about 125 microns and about 150 microns in size, and said supporting means providing a good fluid flow passageway in the plane thereof which exerts an average back pressure not greater than about 300 p.s.i. per linear foot when said fluid mixture inlet pressure is about 2000 p.s.i. and the rate of flow of fluid through said membrane sheet is about 25 milliliters per minute per 100 square inches of effective membrane surface.

6. Separation apparatus for separating a first fluid component from a fluid mixture comprising a semipermeable membrane sheet, means for supplying under pressure a fluid mixture of a first fluid component and a second component to one side of said membrane sheet, said membrane when contacted with the fluid mixture above a certain pressure permitting passage of the first fluid component therethrough from said one side to the other side while rejecting passage of a high percentage of the second component, and membrane supporting means in contact with said other side of said membrane sheet and providing support therefor to prevent excessive irregular physical deformation of said membrane sheet from said fluid mixture pressure, said membrane supporting means including a layer of interconnected particles of silicon dioxide disposed upon a thin porous substrate made of polyester fibers, said particle layer being made from particles between about 125 microns and about 150 microns in size, said particle layer being at least about 10 mils in thickness, and said supporting means providing a good fluid flow passageway in the plane thereof which exerts an average back pressure not greater than about 300 p.s.i. per linear foot when said fluid mixture inlet pressure is about 2000 p.s.i. and the rate of flow of fluid through said membrane sheet is about 25 milliliters per minute per 100 square inches of effective membrane surface.

References Cited

UNITED STATES PATENTS

| 2,668,787 | 2/1954 | Schramm | 161—162 X |
| 2,824,620 | 2/1958 | De Rosset | 55—16 |
| 3,241,298 | 3/1966 | Pierce | 55—16 X |
| 3,266,223 | 8/1966 | Dresser et al. | 55—521 X |

FOREIGN PATENTS

| 539,797 | 9/1941 | Great Britain. |

OTHER REFERENCES

J. O. Osburn, and K. Kammermeyer, "New Diffusion Cell Design" Industrial and Engineering Chemistry, vol. 46, No. 4. pp. 739 to 742.

SAMIH N. ZAHARNA, *Primary Examiner.*

REUBEN FRIEDMAN, *Examiner.*

W. S. BRADBURY, *Assistant Examiner.*

UNITED STATES PATENT OFFICE
CERTIFICATE OF CORRECTION

Patent No. 3,367,505                                February 6, 1968

Donald T. Bray

It is hereby certified that error appears in the above numbered patent requiring correction and that the said Letters Patent should read as corrected below.

Column 3, line 35, after "pressure" insert -- of --; column 6, line 9, for "approximately" read -- appropriately --.

Signed and sealed this 22nd day of April 1969.

(SEAL)
Attest:

Edward M. Fletcher, Jr.                              EDWARD J. BRENNER
Attesting Officer                                       Commissioner of Patents